United States Patent [19]

Doin et al.

[11] Patent Number: 4,559,271

[45] Date of Patent: Dec. 17, 1985

[54] THERMOFORMABLE SILICONE RESIN COATING COMPOSITION AND DUAL COMPONENT COATING SYSTEM FOR POLYCARBONATE

[75] Inventors: James E. Doin, Hoosick Falls; Howard A. Vaughn, Jr., Schenectady, both of N.Y.

[73] Assignee: General Electric Company, Waterford, N.Y.

[21] Appl. No.: 635,301

[22] Filed: Jul. 27, 1984

Related U.S. Application Data

[62] Division of Ser. No. 415,457, Sep. 7, 1982, Pat. No. 4,477,499.

[51] Int. Cl.$^4$ .................... C08G 77/00; B32B 27/36; B32B 27/30; B05D 3/06
[52] U.S. Cl. ............................ 428/412; 427/412.1; 428/447; 428/522; 524/89; 524/188; 524/265; 524/266; 524/385; 524/588; 524/721; 524/767; 524/837; 524/838
[58] Field of Search ............... 428/412, 447, 522; 427/412.1; 524/89, 188, 767, 837, 838, 588, 385, 721, 266, 265

[56] References Cited

U.S. PATENT DOCUMENTS

| | | | |
|---|---|---|---|
| 4,311,763 | 1/1982 | Conroy | 428/412 |
| 4,322,476 | 3/1982 | Molari | 428/412 |
| 4,324,839 | 4/1982 | Frye | 428/412 |
| 4,368,236 | 1/1983 | Frye | 428/412 |
| 4,390,660 | 6/1983 | Ashby | 524/721 |
| 4,395,461 | 6/1983 | Ching | 428/412 |
| 4,404,257 | 9/1983 | Olson | 428/412 |
| 4,410,594 | 10/1983 | Olson | 428/412 |
| 4,414,349 | 11/1983 | Vaughn, Jr. et al. | 524/588 |
| 4,477,528 | 10/1984 | Frye | 428/447 |
| 4,478,876 | 10/1984 | Chung | 428/412 |
| 4,486,504 | 12/1984 | Chung . | |

*Primary Examiner*—Herbert J. Lilling

[57] ABSTRACT

Ultraviolet radiation resistant silicone resin coating compositions are provided having improved thermoformability. Improved thermoformability and shortened required aging are achieved by the addition of a Lewis acid compound to the coating compositions is disclosed. Thermoformability is also improved by using the UV screen containing silicone resin coating composition in conjunction with extensible acrylate primers.

21 Claims, No Drawings

THERMOFORMABLE SILICONE RESIN COATING COMPOSITION AND DUAL COMPONENT COATING SYSTEM FOR POLYCARBONATE

This is a divisional of U.S. Application Ser. No. 415,457 filed Sept. 7, 1982, now U.S. Pat. No. 4,477,499.

BACKGROUND OF THE INVENTION

This invention relates to thermoplastic substrates covered with a protective coating. More particularly, it relates to improved silicone resin coating compositions for substrates which, after curing, may be thermoformed without showing cracks or adhesion failure. The thermoformable top coat forms an adherent protective, abrasion-resistant layer on the substrate.

Recently, the substitution of glass glazing with transparent materials which do not shatter or are more resistant to shattering than glass has become widespread. For example, transparent glazing made from synthetic organic polymers is now utilized in public transportation vehicles such as trains, buses, taxis and airplanes. Lenses for eye glasses and other optical instruments, as well as glazing for large buildings, also employ shatter-resistant, transparent plastics. The lighter weight of these plastics in comparison to glass is a further advantage, especially in the transportation industry where the weight of the vehicle is a major factor in its fuel economy.

While transparent plastics provide the major advantage of being more resistant to shattering and lighter than glass, a serious drawback lies in the ease with which these plastics mar and scratch due to everyday contact with abrasives such as dust or cleaning equipment. Marring results in impaired visibility and poor aesthetics, and often requires replacement of the glazing or lens or the like.

One of the most promising and widely used transparent plastics for glazing is polycarbonate, such as that known as Lexan ®, sold by General Electric Company. It is a tough material, having high impact strength, high heat deflection temperature and good dimensional stability. It is also self-extinguishing and easily fabricated. Acrylics, such as polymethylmethacrylate, are also widely used transparent plastics for glazing.

To improve the abrasion resistance of plastics, mar-resistant coatings formed from mixtures of silica, such as colloidal silica or silica gel, and hydrolyzable silanes in a hydrolysis medium, such as alcohol and water, have been developed. U.S. Pat. No. 3,708,225 (Misch et al.), U.S. Pat. No. 3,986,997 (Clark), U.S. Pat. No. 4,027,073 (Clark), U.S. Pat. No. 4,149,206 (Armbruster et al.) and U.S. Pat. No. 4,177,315 (Ubersax), for example, describe such compositions. Improved such compositions are described in commonly assigned copending U.S. Application Ser. No. 964,910, filed Nov. 30, 1978 (now abandoned) and U.S. Pat. No. 4,277,287 (Frye) and U.S. Pat. No. 4,309,319 (Vaughn, Jr.).

Silicone resin coatings have been additionally improved in recent years by the addition of compounds which screen or absorb ultraviolet radiation and thereby serve to prolong the service life of coated articles. Such coatings and compounds are described, for example, in U.S. Pat. No. 4,299,746 (Frye) and U.S. Pat. No. 4,278,804 (Ashby et al.), U.S. Pat. No. 4,373,060 (Ching), U.S. Pat. No. 4,373,061 (Ching), and U.S. Pat. No. 4,374,674 (Ashby et al.).

In order to promote adhesion of silicone resin coating compositions to thermoplastic substrates such as Lexan ® or polymethylmethacrylate, primer coats are often necessary. U.S. Pat. No. 4,188,451 (Humphrey), for example, discloses the UV-cured reaction product of a polyfunctional acrylic ester and an unsaturated radical-containing silane as a primer, and the aforementioned U.S. Pat. No. 4,309,319 discloses the use of a thermosetting acrylic resin. The aforementioned Ching patents, on the other hand, disclose UV screen-functionalized compositions which do not need primers and instead adhere directly to polycarbonate substrates without pre-treatment (other than routine cleaning), although an aging period is required after preparation of the compositions before they are ready to use.

All of the above-mentioned patents and applications are incorporated herein by reference.

Two disadvantages to the abrasion-resistant silicone resin coating compositions currently used to coat polycarbonate are that they are not thermoformable after curing, especially in thick applications, and primerless coatings must be aged, as mentioned previously. Poor thermoformability means that bending or working a coated polycarbonate substrate will often lead to cracking or crazing of the silicone coating. As a consequence, articles must be coated after forming, which may entail time delays and shipment of uncoated articles which may be inadvertently abraded in transit. The aging period required for the aforementioned primerless coating compositions entails warehousing the prepared compositions, the costs of which may outweigh any disadvantages in using primer coats.

It has now been discovered that the thermoformability of the UV screen-functionalized compositions described by Ching in U.S. Pat. Nos. 4,373,060 and 4,373,061 can be improved and their aging time substantially reduced by the addition of a small amount of a Lewis acid compound, such as ferric chloride, aluminum chloride, zinc chloride, and the like. Thermoformability and other physical properties are also improved when those coating compositions are used in conjunction with thermoplastic acrylate primers. Use of a Lewis acid compound has been found to assist the incorporation of silylated UV screens into the structure of silicone resin coating compositions and to improve their thermoformability. Employing extensible acrylate primers with the above-mentioned silicone resins, which are disclosed to be primerless coating compositions on polycarbonate, results in a dual component coating system which is thermoformable after curing.

SUMMARY OF THE INVENTION

Accordingly, it is an object of the present invention to provide a silicone resin coating composition with improved thermoformability when applied to thermoplastic substrates.

It is a further object of the present invention to provide a means of reducing the aging period required in certain silicone resin coating compositions containing silylated ultraviolet radiation screening compounds.

It is a further object of the present invention to provide a dual component silicone resin coating system for polycarbonate which is thermoformable.

These and other objects are accomplished herein by a silicone resin coating composition comprising a colloidal silica filled thermoset organopolysiloxane containing a silylated ultraviolet radiation screening compound and a small amount of a Lewis acid compound.

Another embodiment of the present invention provides a dual component coating system for thermoplastic substrates which includes:

(A) a primer composition comprising from about 0.5 to about 10 parts by weight of a thermoplastic acrylic polymer in about 99.5 to about 90 parts by weight of a volatile solvent, and (B) a colloidal silica filled thermoset organopolysiloxane coating composition containing a silylated ultraviolet radiation screening compound and optionally a small amount of a Lewis acid compound.

Also contemplated herein are thermoformable coated articles comprising a polycarbonate substrate having at least one surface coated with:

(1) a layer of a primer composition comprising from about 0.5 to about 10 parts by weight of a thermoplastic acrylic polymer in about 99.5 to about 90 parts by weight of a volatile solvent, and (2) a layer of a cured top coat containing a colloidal silica filled thermoset organopolysiloxane containing a silylated ultraviolet radiation screening compound and, optionally, a small amount of a Lewis acid compound.

DETAILED DESCRIPTION OF THE INVENTION

This invention relates to primerless* silylated UV screen-containing organopolysiloxane coating compositions for polycarbonate substrates which are rendered thermoformable after curing by addition of a Lewis acid compound and/or by using said composition in conjunction with a thermoplastic acrylic polymer primer composition. The coating compositions of the present invention can be applied to a polycarbonate substrate and cured by heating for short periods at temperatures in the range of from about 90° C. to about 200° C., after which the coated substrate may be thermoformed without inducing cracking or crazing in the cured coating. Similarly, where the dual component coating system of the present invention is employed, the acrylate primer layer is applied to a substrate and thermally dried, e.g., at 125° C. for 15–30 minutes, and the organopolysiloxane top coat is applied and cured, after which the coated polycarbonate substrate may be thermoformed without cracking the protective silicone resin coating.

*As mentioned before, the coating compositions employed herein will adhere to polycarbonate substrates without primers; however, certain features of the present invention call for use of these "primerless" compositions in conjunction with acrylic primers to achieve thermoformability.

"Thermoforming" is a well known term in the plastics art describing the process of shaping thermoplastic sheets by heating them until softened, then forming them into desired shapes on a mold or jig. As used herein, the term extends also to the coatings applied to thermoplastic sheets which are later thermoformed. Thermoformable coatings are those which can be successfully applied to a sheet substrate, cured and thermoformed along with the substrate without showing cracking or crazing.

The polycarbonates for which the coating compositions and coating system of the present invention are especially useful include polycarbonates having recurring units of the formula:

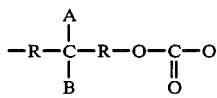

wherein each —R— is selected from the group consisting of phenylene, halo-substituted phenylene and alkyl substituted phenylene; and A and B are each selected from the group consisting of hydrogen, hydrocarbon radicals free from aliphatic unsaturation and of radicals which together with the adjoining carbon atom form a cycloalkane radical, the total number of carbon atoms in A and B being up to 12.

The aromatic carbonate polymer may be prepared by methods well known in the art and as described in U.S. Pat. No. 3,989,672, all of which are incorporated by reference.

Also included herein are branched polycarbonates wherein a polyfunctional aromatic compound is reacted with the dihydric phenol and carbonate precursor to provide a thermoplastic randomly branched polycarbonate wherein the recurring units of Formula I contain branching groups.

The preferred polycarbonate resins may be derived from the reaction of bisphenol-A and phosgene. These polycarbonates have from 10–400 recurring units of the formula:

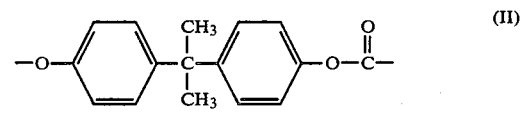

The polycarbonate should have an intrinsic viscosity between 0.3 and 1.0, preferably from 0.40 to 0.65 as measured at 25° C. in methylene chloride.

The thermoplastic acrylic polymers which are employed in the priming material in accordance with this invention are those thermoplastic acrylic polymers well known in the art as thermoplastic acrylic polymers. Exemplary thermoplastic acrylic polymers employed in the practice of this invention are set forth, for example, in *Encyclopedia of Polymer Science and Technology*, Vol. 1 Interscience Publishers, John Wiley & Sons, Inc., copyright 1964, at pp. 246 et seq. and the references cited therein, all of which are hereby incorporated by reference.

The term "thermoplastic acrylic polymers" as used herein is meant to embrace within its scope those thermoplastic polymers resulting from the polymerization of one or more acrylic acid ester monomers as well as methacrylic acid ester monomers. These monomers are represented by the general formula:

$$CH_2=CYCOOR' \qquad (III)$$

wherein Y is H or a methyl radical and R' is an alkyl radical, preferably one containing from 1 to about 20 carbon atoms.

Examples of alkyl groups represented by R' in the above general formula are methyl, ethyl, n-propyl, isopropyl, n-butyl, isobutyl, sec-butyl, tert-butyl, n-amyl and the various positional isomers thereof, and likewise the corresponding straight and branched chain isomers of pentyl, hexyl, heptyl, octyl, nonyl, decyl and the like.

Exemplary acrylic acid ester monomers represented by Formula III include methyl acrylate, isopropyl acrylate, n-propyl acrylate, n-butyl acrylate, isobutyl acrylate, sec-butyl acrylate, 2-ethylhexyl acrylate, etc. Exemplary methacrylic acid ester monomers represented by Formula III include methyl methacrylate, ethyl methacrylate, n-butyl methacrylate, isobutyl methacrylate, hexyl methacrylate, etc. Copolymers of the above acrylate and/or methacrylate monomers are also included within the term "thermoplastic acrylic polymers" as it appears herein. The polymerization of the monomeric acrylic acid esters and methacrylic acid esters to provide the thermoplastic acrylic polymers useful in the practice of the invention may be accomplished by any of the well known polymerization techniques. The thermoplastic acrylic polymers having a molecular weight of at least about 15,000 generally are preferred in the practice of the instant invention.

The thermoplastic acrylic polymers useful in the practice of the instant invention include acrylic ester homopolymers derived from acrylic acid ester monomers; methacrylic ester homopolymers derived from methacrylic acid ester monomers; and copolymers derived from two different acrylic acid ester monomers, or two different methacrylic acid ester monomers, or an acrylic acid ester monomer and a methacrylic acid ester monomer.

Mixtures of two or more of the aforedescribed thermoplastic acrylic polymers, e.g., two or more different acrylic ester homopolymers, two or more different acrylic ester copolymers, two or more different methacrylic ester homopolymers, two or more different methacrylic ester copolymers, an acrylic ester homopolymer and a methacrylic ester homopolymer, an acrylic ester copolymer and an acrylic ester copolymer, an acrylic ester homopolymer and a methacrylic ester copolymer, etc., can also be used in the present invention.

The thermoplastic acrylic polymers are in general applied as primers from a primer composition containing said thermoplastic acrylic polymer and a volatile solvent, either organic or inorganic in nature, which is inert, i.e., will not react with the polycarbonate part to be treated, but which is capable of dissolving the thermoplastic acrylic polymers. Generally, the concentration of the thermoplastic acrylic polymer in the priming composition ranges from about 0.5 to about 10 percent by weight, preferably from about 0.5 to about 2 percent. Examples of suitable solvent systems include ethylene glycol diacetate, butoxyethanol, ethoxy ethanol, diacetone alcohol, hydroxyethyl acetate, cellosolve acetate and combinations thereof.

The primer compositions thus prepared must be extensible, having a degree of plasticity or softening at thermoforming temperatures, so as not to crack or craze upon thermoforming.

The primer compositions of the instant invention may also optionally contain various flatting agents, ultraviolet light absorbing agents, surface active agents and thixotropic agents. All of these additives and the use thereof are well known in the art and do not require extensive discussions.

When the dual component coating system of the present invention, which includes a primer composition, is employed, a uniform film of the primer composition is applied onto the polycarbonate surface by any of the known means such as dipping, spraying, roll-coating and the like. After the polycarbonate substrate is coated with the primer composition, the inert volatile solvent is removed by drying the coated article until the volatile solvent evaporates, leaving a primer layer containing the thermoplastic acrylic polymer on the polycarbonate surface to which the primer composition was applied. It has been found necessary to obtain the advantages of the present invention that the primer layer be thermally dried, after application to the polycarbonate substrate, at temperatures from about 90° C. to 130° C. It has been observed that coated articles having air dried primer layers do not exhibit the degree of thermoformability contemplated herein. Generally, the primer layer is a uniform film having a thickness varying between about 0.002 mil to about 0.1 mil, preferably between about 0.01 mil to about 0.05 mil.

In the dual component coating system of the present invention, after the polycarbonate has been primed by the application of the primer composition and the solvents of the primer have been evaporated, the primed polycarbonate substrate is then coated with the colloidal silica filled thermoset organopolysiloxane containing a silylated ultraviolet radiation screening compound and optionally containing a small amount of a Lewis acid compound.

For the purposes herein, a "Lewis acid compound" is a substance that will act in solution as a Lewis acid, that is, will take up an electron pair to form a covalent bond. In other words, they are compounds which act as "electron pair acceptors". This includes the "proton donor" concept of the Lowry-Brønsted definition of acids.

Lewis acid compounds, when added to the silylated UV screen-containing silica filled polysiloxane coating compositions of the present invention, improve the thermoformability of the polysiloxane coating compositions and also reduce the aging period often required before they can be used. Preferred Lewis acid compounds for the purposes herein include aluminum chloride, ferric chloride and zinc chloride. Ferric chloride is most preferred.

Very small amounts of the Lewis acid compounds will effect improvement not only in thermoformability and aging time, but also will improve resistance of the coating to cracking from UV exposure and to loss of adhesion from moisture. For the purposes of the present invention, from about 10 to 30 parts per million (ppm) are preferred, but any amount sufficient to enhance the thermoformability of the cured coating compositions or reduce the required aging time is contemplated.

When the aforementioned Lewis acid compounds are employed in the colloidal silica filled thermoset organopolysiloxane coating compositions herein, the coating composition, which contains a silylated UV screen, may be applied to a polycarbonate substrate without a primer coat, and the coating composition will show improved thermoformability. However, coating compositions treated with Lewis acid compounds as described above are also contemplated for use in the dual component coating system of this invention.

Colloidal silica filled thermoset organopolysiloxane coating compositions which are suitable for the purposes herein are disclosed in the patents and applications already mentioned and incorporated by reference above. Generally, they are comprised of a dispersion of colloidal silica in a lower aliphatic alcohol-water solution of the partial condensate of a silanol having the formula:

$$R^2Si(OH)_3 \qquad (IV)$$

wherein $R^2$ is selected from the group consisting of alkyl radicals containing from 1 to 3 carbon atoms, vinyl, 3,3,3-trifluoropropyl radicals and γ-glycidoxypropyl radicals, with at least 70 percent by weight of said silanol being $CH_3Si(OH)_3$. This composition generally contains from about 10 to about 50 percent by weight of solids, said solids consisting essentially of a mixture of from about 10 to about 70 percent by weight of colloidal silica and from about 30 to about 90 percent by weight of the partial condensate of a silanol. The partial condensate of a silanol, i.e., a siloxanol, is obtained, preferably, entirely from the condensation of $CH_3Si(OH)_3$, however, the partial condensate may also optionally be comprised of a major portion which is obtained from the condensation of $CH_3Si(OH)_3$ and a minor portion which is obtained from the condensation of monoethyltrisilanol, monopropyltrisilanol, monovinyltrisilanol, mono gamma-methacryloxypropyltrisilanol, mono gamma-glydicoxypropyltrisilanol, or mixtures thereof.

The trisilanol component of the top coat composition of the present invention is generated in situ by the addition of the corresponding trialkoxysilanes to aqueous dispersions of colloidal silica. Suitable trialkoxysilanes are those containing methoxy, ethoxy, isopropoxy and t-butoxy substituents. Upon generation of the silanol in the aqueous medium, there is condensation of the hydroxyl substituents to form —Si—O—Si— bonding. The condensation is not complete, but rather the siloxane retains an appreciable quantity of silicon-bonded hydroxyl groups, thus rendering the organopolysiloxane polymer soluble in the water-alcohol solvent. This soluble partial condensate can be characterized as a siloxanol polymer having at least one silicon-bonded hydroxyl group per every three —SiO— units. During cure of the top coating composition on the primer, these residual hydroxyl groups condense to give a silsesquioxane, $R^2SiO_{3/2}$.

The silica component of the coating composition is present in the form of colloidal silica. Aqueous colloidal silica dispersions vary substantially in particle size. Typical available commercial silicas have particle sizes in the range of 3 to 100 millimicrons in diameter. Particles up to 150 millimicrons in diameter can be used in these coating compositions. These silica dispersions are prepared by methods well known in the art and are commercially available. It is preferred to use colloidal silica having a particle size in the range of 5 to 20 millimicrons in diameter in order to obtain dispersions having a greater stability and to provide top coatings having superior optical properties.

The colloidal silica filled thermoset polysiloxane coating compositions of the present invention are typically prepared by adding triakoxysilanes to a colloidal silica hydrosol and adjusting the pH by adding acid or base. Such compositions are disclosed to have a useful pH range of 3.0 to 8.0, with variations in particular physical properties, such as cure time and abrasion resistance, occurring within that range. Simple experimentation will allow the practicioner to tailor the silicone resins' characteristics to his individual needs. Acid (or base) may be added either to the silane component or the silica hydrosol component before the two are mixed to adjust the pH.

Alcohol is generated during the hydrolysis of the trialkoxysilanes to the silanetriols. Depending on the percens solids desired in the final coating composition, additional alcohol, water, or a water-miscible solvent may be added. Suitable alcohols for this purpose are lower aliphatic alcohols such as methanol, ethanol, isopropanol, t-butanol, isobutanol and mixtures thereof. Generally, the solvent system should contain from about 20 to about 75 percent by weight alcohol to ensure the solubility of the siloxanol formed by condensation of the silanol. If desired, minor amounts, i.e., up to about 20 percent by weight, of a water-miscible polar solvent such as acetone, butyl cellosolve, diacetone alcohol, and the like can be added to the water-alcohol solvent system. Particularly good results have been observed herein with compositions containing about 5–10 percent by weight of the total composition of diacetone alcohol. The preferred cosolvent system is a mixture of isobutanol and diacetone alcohol.

Generally, sufficient alcohol or water-alcohol solvent is added to give a composition containing from about 10 to about 50 percent by weight of solids, said solids generally comprising from about 10 to about 70 percent by weight of colloidal silica and from about 30 to about 90 percent by weight of the partial condensate of the silanol.

The above-described organopolysiloxane coating compositions also contain a silylated ultraviolet radiation screening compound. Suitable such compounds are described in the aforementioned Ching applications Ser. Nos. 154,623 and 154,624, incorporated herein by reference. The UV screening compounds used in accordance with the present invention must be soluble in, and otherwise compatible with, the organopolysiloxane hydrolyzate. They copolymerize into the silicone, as demonstrated by the low volatility upon curing and continuous heating. The UV screening compounds used in this invention are particularly effective in protecting polycarbonate from discoloration when the present coating compositions are applied to the surface thereof. Suitable compounds include hindered amine- and modified benzophenone-type UV screens. A preferred compound is 4(3-triethoxysilylpropoxy)-2-hydroxybenzophenone [SHBP].

Any amount of ultraviolet radiation screening compound which is effective to prevent discoloration of the substrate to which the UV screen-containing composition is applied can be used. In general, best results are obtained where the UV compound is employed in amounts of from about 8 percent to about 20 percent by weight of the total solids of the coating composition. Levels of about 12 percent to about 16 percent by weight are most preferred.

Other additives and modifying agents, such as thickeners, pigments, dyes and the like, may also be added to the coating compositions of the present invention. A particularly desirable additive has been found to be a small amount of a polysiloxane polyether copolymer flow control additive. It has been found that these compounds have a beneficial effect in preventing the occurrence of undesirable flowmarks and dirtmarks which sometimes occur with the application of the coating composition to a substrate. A particularly useful polysiloxane polyether copolymer for the purposes herein is known as SF-1066, available from the General Electric Company; another is BYK-300, sold by Mallinkrodt. The preparation, further description and structural formulae for these polysiloxane polyether copolymers are described in U.S. Pat. Nos. 3,629,165 and 4,277,287, incorporated herein by reference. Generally, the polysiloxane polyether copolymers are employed in amounts of from about 2.5% to about 15% by weight of the total solids content of the composition.

As discussed previously, unless a Lewis acid compound is added to the UV screen-containing coating composition according to this invention, it has been found essential that the total admixture be allowed to age before use. By aging, it is meant standing at 10° C., or above, preferably at about room temperature, e.g., 18°–24° C., for at least 42 hours, but preferably for a minimum time of from about 20 to 30 days. While the nature of aging process with respect to the compositions of this invention is not fully understood, it is believed that the ultraviolet radiation screening compound is actually being chemically incorporated into the structure of the organopolysiloxane hydrolyzate. In any event, it has been found that if the compositions are not properly aged after the addition of the UV screen, inferior adhesion of the coating to the unprimed substrate, cracking, and poorer abrasion resistance may result.

Addition of a Lewis acid compound to the coating compositions of this invention effectively reduces the required aging period to about 3 to 7 days. Compositions thus treated will still exhibit primerless adhesion to polycarbonate substrates as well as improved thermoformability and other advantages already mentioned. Alternatively, the UV screen-containing coating compositions, with or without the Lewis acid compound, can be used with the primer compositions described herein to yield thermoformable, protectively coated thermoplastic articles.

The coating compositions of this invention will cure on polycarbonate at temperatures of, for example, 125° C. without the aid of an added curing catalyst. However, in general, catalyst in the amounts of from about 0.05 to about 0.5 weight percent, preferably about 0.1 weight percent, of the composition can be used. Compositions containing catalysts in these amounts can be cured on a solid substrate in a relatively short time at temperatures in the range of from about 90° C.–200° C. to provide a transparent, abrasion-resistant surface coating.

The organopolysiloxane coating composition, whether applied as a sole coat or over a primer coat, may be applied by any of the commonly known methods such as spraying, dipping, flow-coating, etc. By choice of the proper formulation and processing conditions, a variety of serviceable coating compositions and coating systems is provided. A hard coating having all of the aforementioned characteristics and advantages is obtained by the removal of the solvent and volatile materials. The top coating composition will air-dry to a tack-free condition, but heating in the range of 90° C. to 200° C. is necessary to obtain condensation of residual silanols in the partial condensate. To obtain condensation below about 125° C., the compositions must be properly catalyzed. Curing at temperatures as low as 75° C. is possible with high activity condensation catalysts, although this type of catalyst is ordinarily only used where long shelf life is not important. This final cure results in the formation of silsesquioxane (RSiO$_{3/2}$). In the finished cure top coating having a ratio of RSiO$_{3/2}$ to SiO$_2$ will range from about 0.43 to about 9.0, preferably 1 to 3. A cured top coating having a ratio of RSiO$_{3/2}$ to SiO$_2$, where R is methyl, of 2 is most preferred. Coating resistance may vary, but for the high abrasion resistance desired herein, coating thicknesses of 3–10 microns, preferably 5 microns, are utilized.

In order that those skilled in the art may better understand how to practice the present invention, the following examples are given by way of illustration and not by way of limitation.

EXAMPLE I

A stock colloidal silica filled thermoset resin coating composition was prepared as follows:

22.1 parts by weight of Ludox LS® silica sol (aqueous dispersion of colloidal silica; Dupont) was added to a solution of 0.08 parts by weight of acetic acid in 26.8 parts by weight of methyltrimethoxysilane. The temperature of the reaction was maintained at 25° C. The hydrolysis was allowed to continue for about 24 hours. The resulting hydrolyzate was about 40.6% solids and was diluted to about 20% solids by the addition of isobutanol. 0.8 parts by weight (4% of solids) of SF-1066 (polysiloxane polyether copolymer; General Electric Co.) was thoroughly mixed with 99 parts by weight of the hydrolyzate composition. The final composition had a pH of 7.3.

Four modified resins were made from the stock resin, as follows (proportions are in parts by weight):

|  | Compositions | | | |
| --- | --- | --- | --- | --- |
|  | A | B | C | D |
| stock resin | 3300 | 3300 | 3300 | 3300 |
| SHBP* | 79 | 79 | 79 | 79 |
| diacetone alcohol | — | 26 | — | 26 |
| isobutanol | 316 | 290 | 316 | 290 |
| ferric chloride | — | — | 0.21 | 0.21 |

*4(3-triethoxysilylpropoxy)-2-hydroxybenzophenone

By blending the portions of these four resins and adding additional water, isobutanol and diacetone alcohol, the solids content and combinations of iron, water and diacetone alcohol were varied. SHBP concentration was maintained at 12% by weight of the original stock resin solids.

Test coating compositions were coated on Lexan® sheets, dried 20 minutes and cured 5 hours at 135° C. The sheets were then cut into plaques for testing. All sheets passed an initial scribed adhesion test, wherein a grid of 100 1 mm by 1 mm squares is cut on the surface of a sheet, 3M 710 tape applied and pulled off. Three tape pulls without adhesion failure is considered passing.

The plaques were tested for abrasion resistance, adhesion loss due to moisture and resistance to ultraviolet radiation weathering. Abrasion resistance was tested on a Taber Abraser in which the increase in haze (Δ%H) is measured after the coated surface is subjected to 500 cycles of abrasive CF-10 wheels with a 500 g weight on each wheel. Adhesion loss was tested by immersing plaques in a 65° C. water bath and periodically removing plaques for scribed adhesion testing, described above, until coating adhesion failed. UV- and moisture resistance were tested on a QUV Accelerated Weathering Tester, in which plaques are exposed to alternating cycles of UV radiation at 60° C. for 8 hours, followed by a condensation cycle at 50° C. for 4 hours. Plaques are periodically removed and subjected to scribed adhesion testing until coating adhesion fails.

The results of these tests are shown in the following tables. "Top", "Middle" and "Bottom" refers to the section of the coated Lexan® sheets from which the plaques were cut.

| Test Compositions | % Solids | % Water | % Diacetone Alcohol | γ ppm Iron |
| --- | --- | --- | --- | --- |
| 1 | 20 | 8.6 | 0.8 | 10 |

-continued

| Test Compositions | % Solids | % Water | % Diacetone Alcohol | γ ppm Iron |
|---|---|---|---|---|
| 2 | 20 | 11.1 | 0.8 | 20 |
| 3 | 20 | 11.0 | 0.8 | 0 |
| 4 | 20 | 11.0 | 1.6 | 10 |
| 5 | 20 | 11.0 | 0.0 | 10 |
| 6 | 20 | 13.6 | 0.8 | 10 |
| 7 | 18 | 10.8 | 0.8 | 10 |
| 8 | 18 | 11.0 | 0.8 | 10 |
| 9 | 18 | 11.2 | 0.0 | 20 |
| 10 | 18 | 11.0 | 0.0 | 0 |
| 11 | 18 | 8.4 | 1.6 | 10 |
| 12 | 18 | 8.5 | 0.0 | 10 |
| 13 | 18 | 8.6 | 0.8 | 20.0 |
| 14 | 18 | 8.6 | 0.8 | 0.0 |
| 15 | 18 | 11.0 | 0.8 | 10.0 |
| 16 | 18 | 11.1 | 1.6 | 20.0 |
| 17 | 18 | 11.2 | 1.6 | 0.0 |
| 18 | 18 | 13.4 | 0.0 | 10.0 |
| 19 | 18 | 13.4 | 0.8 | 20.0 |
| 20 | 18 | 13.5 | 0.8 | 0.0 |
| 21 | 18 | 13.3 | 1.6 | 10.0 |
| 22 | 16 | 8.4 | 0.8 | 10.0 |
| 23 | 16 | 10.6 | 0.0 | 10.0 |
| 24 | 16 | 10.7 | 0.8 | 20.0 |
| 25 | 16 | 10.6 | 0.8 | 0.0 |
| 26 | 16 | 10.7 | 1.6 | 10.0 |
| 27 | 16 | 13.0 | 0.8 | 10.0 |

TABLE I

ABRASION RESISTANCE (Δ% H$_{500}$)

| Test Composition | Average | Top | Middle | Bottom |
|---|---|---|---|---|
| 1 | 4.5 | 7.6 | 4.6 | 4.4 |
| 2 | 5.8 | 8.0 | 3.9 | 5.6 |
| 3 | 7.2 | 11.5 | 4.4 | 5.6 |
| 4 | 6.3 | 9.0 | 4.1 | 5.8 |
| 5 | 6.1 | 7.0 | 5.0 | 6.3 |
| 6 | 5.8 | 6.7 | 5.1 | 5.6 |
| 7 | 8.6 | 14.3 | 5.1 | 6.3 |
| 8 | 6.6 | 9.8 | 4.1 | 5.8 |
| 9 | 6.9 | 10.7 | 4.1 | 5.9 |
| 10 | 6.9 | 10.2 | 4.4 | 6.1 |
| 11 | 7.1 | 11.5 | 4.0 | 5.8 |
| 12 | 6.7 | 9.6 | 4.9 | 5.6 |
| 13 | 6.2 | 8.7 | 4.4 | 5.5 |
| 14 | 6.8 | 7.9 | 5.2 | 7.2 |
| 15 | 7.3 | 9.4 | 5.3 | 7.2 |
| 16 | 6.6 | 9.1 | 4.4 | 6.4 |
| 17 | 6.9 | 10.0 | 5.4 | 5.2 |
| 18 | 6.5 | 8.4 | 4.7 | 6.3 |
| 19 | 6.1 | 8.2 | 5.0 | 5.1 |
| 20 | 7.3 | 9.3 | 5.4 | 7.1 |
| 21 | 6.4 | 8.8 | 4.8 | 5.5 |
| 22 | 7.6 | 11.7 | 5.5 | 5.6 |
| 23 | 9.3 | 16.2 | 5.4 | 6.3 |
| 24 | 11.6 | 24.4 | 5.4 | 4.9 |
| 25 | 10.2 | 16.3 | 6.5 | 7.8 |
| 26 | 9.9 | 14.5 | 6.3 | 8.9 |
| 27 | 8.8 | 15.2 | 5.1 | 6.0 |

TABLE II

65° C. WATER SOAK (hours to adhesion failure)

| Test Composition | Average | Top | Middle | Bottom |
|---|---|---|---|---|
| 1 | 144 | 144 | 168 | 120 |
| 2 | 216 | 216 | 216 | 216 |
| 3 | 120 | 120 | 144 | 96 |
| 4 | 176 | 192 | 168 | 168 |
| 5 | 88 | 96 | 72 | 96 |
| 6 | 96 | 96 | 96 | 96 |
| 7 | 120 | 120 | 144 | 96 |
| 8 | 144 | 168 | 144 | 120 |
| 9 | 128 | 120 | 144 | 120 |
| 10 | 96 | 120 | 96 | 72 |
| 11 | 120 | 144 | 144 | 72 |
| 12 | 96 | 120 | 96 | 72 |
| 13 | 112 | 120 | 144 | 72 |
| 14 | 72 | 72 | 72 | 72 |
| 15 | 72 | 72 | 72 | 72 |
| 16 | 176 | 216 | 216 | 96 |
| 17 | 136 | 168 | 144 | 96 |
| 18 | 96 | 96 | 96 | 96 |
| 19 | 104 | 96 | 96 | 120 |
| 20 | 80 | 72 | 72 | 96 |
| 21 | 120 | 120 | 144 | 96 |
| 22 | 120 | 120 | 144 | 96 |
| 23 | 65 | 72 | 72 | 52 |
| 24 | 72 | 172 | 72 | 72 |
| 25 | 156 | 120 | 192 | — |
| 26 | 65 | 72 | 72 | 52 |
| 27 | 80 | 96 | 72 | 72 |

TABLE III

QUV HOURS (hours to adhesion failure)

| Test Composition | Average | Top | Middle | Bottom |
|---|---|---|---|---|
| 1 | 1316 | 598 | 1195 | 2155 |
| 2 | 1084 | 598 | 1098 | 1555 |
| 3 | 1012 | 526 | 1195 | 1316 |
| 4 | 1179 | 598 | 1267 | 1673 |
| 5 | 739 | 428 | 741 | 1048 |
| 6 | 988 | 526 | 1027 | 1410 |
| 7 | 717 | 526 | 741 | 884 |
| 8 | 924 | 428 | 1027 | 1316 |
| 9 | 636 | 428 | 667 | 813 |
| 10 | 652 | 574 | 860 | 523 |
| 11 | 924 | 428 | 1027 | 1316 |
| 12 | 709 | 574 | 741 | 813 |
| 13 | 948 | 500 | 1027 | 1316 |
| 14 | 660 | 500 | 667 | 813 |
| 15 | 628 | 500 | 667 | 716 |
| 16 | 971 | 500 | 1098 | 1316 |
| 17 | 892 | 500 | 860 | 1316 |
| 18 | 708 | 500 | 741 | 884 |
| 19 | 749 | 500 | 933 | 813 |
| 20 | 892 | 500 | 860 | 1316 |
| 21 | 780 | 500 | 860 | 981 |
| 22 | 628 | 500 | 667 | 716 |
| 23 | 484 | 428 | 500 | 523 |
| 24 | 524 | 428 | 500 | 643 |
| 25 | 644 | 428 | 860 | 813 |
| 26 | 789 | 526 | 860 | 981 |
| 27 | 636 | 428 | 667 | 813 |

The thermoformability performance of the test compositions was also tested. Lexan ® sheets coated with a given composition were cold formed on a jig to a curved shape having a 32″ radius. The curved sheets were then thermoformed by placing them in an oven at 138° C. for 1 hour. The curved sheets were then removed from the oven, cooled, removed from the jig, and examined for cracks.

The thermoformability results observed are set forth in the following table ("incipient cracks" are cracks that occur only along the cut edge):

| Test Composition | Cracks Observed After Thermoforming |
|---|---|
| 1 | bad |
| 2 | moderate |
| 3 | bad |
| 4 | bad |
| 5 | bad |
| 6 | bad |
| 7 | moderate |

-continued

| Test Composition | Cracks Observed After Thermoforming |
|---|---|
| 8 | slight |
| 9 | moderate |
| 10 | moderate |
| 11 | moderate |
| 12 | slight |
| 13 | slight |
| 14 | moderate |
| 15 | bad |
| 16 | moderate |
| 17 | bad |
| 18 | slight |
| 19 | moderate |
| 20 | bad |
| 21 | moderate |
| 22 | very slight |
| 23 | very slight |
| 24 | incipient |
| 25 | slight |
| 26 | slight |
| 27 | incipient |

EXAMPLE II

A colloidal silica filled thermoset organopolysiloxane coating composition containing 12% by weight of solids SHBP was prepared as in Example I.

A set of primer compositions was prepared by dissolving poly(ethyl methacrylate) resin (Elvacite ® 2042; Dupont) in 2-butoxyethanol at ½, 1 and 2% solids by weight. Each of the primers was flow coated on Lexan ® polycarbonate plaques, allowed to air dry for 15 minutes, and thermally dried for 20 minutes at 125° C. The plaques were then flow coated with the coating composition, which had been previously diluted to 20% solids and aged several weeks at room temperature to hydrolyze the SHBP. The coated plaques were dried at room temperature for 30 minutes, then cured 45 minutes at 130° C.

The plaques were cold-formed on a jig to a 32-inch radius, then heated for 1 hour at 138° C. The plaques were removed from the oven, allowed to cool, removed from the jig, and inspected for cracks. For all 3 primer compositions, only incipient edge cracks were observed in the formed product.

Similar results were obtained with thermally dried poly(isobutyl methacrylate) primer compositions. Plaques coated with non-extensible polymethyl methacrylate primers (½ and 1% solids by weight) showed severe cracking when thermoformed. Plaques coated with the SHBP-containing coating composition but without a primer were thermoformable but showed weaker weathering performance (see Control, infra).

| Sample | Δ% H$_{500}$ | QUV Exposure: Cracking | Adhesion Failure | H$_2$O Soak Until Adhesion Loss |
|---|---|---|---|---|
| ½% PEMA* Primer | 9.6 | 326 hours | 1021 hours | 216 hours |
| 1.0% | 9.4 | 326 hours | 877 hours | 336 hours |
| 2.0% | 9.9 | mottled at 326 hours | 1286 hours | 336 hours |
| Control** | | 183 hours | 877 hours | 65 hours |

*poly(ethyl methacrylate)
**coating composition applied without primer

Obviously, modifications and variations in the present invention are possible in light of the foregoing disclosure. It is understood, however, that any incidental changes made in the particular embodiments of the invention as disclosed are within the full intended scope of the invention as defined by the appended claims.

We claim:

1. A thermoformable coated article comprising a polycarbonate substrate having at least one surface coated with (i) a layer of a thermally dried primer composition comprising about 0.5 to about 10 parts by weight of a thermoplastic acrylic polymer in about 99.5 to about 90 parts by weight of a volatile solvent, and (ii) a layer of a cured top coat comprising a colloidal silica filled thermoset polysiloxane containing a silylated ultraviolet radiation screening compound and a small amount of Lewis acid compound.

2. An article as defined in claim 1, wherein said acrylic polymer is poly(ethyl methacrylate), said volatile solvent is 2-butoxyethanol, and said ultraviolet radiation screening compound is 4(3-triethoxysilylpropoxy)-2-hydroxybenzophenone.

3. An article as defined in claim 2 in which the Lewis acid compound is ferric chloride.

4. An article as defined in claim 1, wherein said volatile solvent is selected from the group consisting of ethyleneglycol diacetate, butoxyethanol, ethoxy ethanol, diacetone alcohol, hydroxyethyl acetate, cellosolve acetate, and combinations thereof.

5. An article as defined in claim 4, wherein said acrylic polymer is poly(ethyl methacrylate).

6. An article as defined in claim 4, wherein said acrylic polymer is poly(isobutyl methacrylate).

7. An article as defined in claim 1, wherein said ultraviolet radiation screening compound is 4(3-triethoxysilylpropoxy)-2-hydroxybenzophenone.

8. A thermoformable coated article comprising a polycarbonate substrate having at least one surface coated with (i) a layer of a thermally dried primer composition comprising about 0.5 to about 10 parts by weight of a thermoplastic acrylic polymer in about 99.5 to about 90 parts by weight of a volatile solvent, and (ii) a layer of a cured top coat comprising a colloidal silica filled thermoset polysiloxane containing a silylated ultraviolet radiation screening compound and a small amount of a Lewis acid compound.

9. An article as defined in claim 8, wherein said volatile solvent is selected from the group consisting of ethyleneglycol diacetate, butoxyethanol, ethoxy ethanol, diacetone alcohol, hydroxyethyl acetate, cellosolve acetate, and combinations thereof.

10. An article as defined in claim 9, wherein said acrylic polymer is poly(ethyl methacrylate).

11. An article as defined in claim 9, wherein said acrylic polymer is poly(isobutyl methacrylate).

12. An article as defined in claim 8, wherein said ultraviolet radiation screening compound is 4(3-triethoxysilylpropoxy)-2-hydroxybenzophenone.

13. An article as defined in claim 8, wherein said acrylic polymer is poly(ethyl methacrylate), said volatile solvent is 2-butoxyethanol, and said ultraviolet radiation screening compound is 4(3-triethoxysilylpropoxy)-2-hydroxybenzophenone.

14. An article as defined in claim 8, wherein said Lewis acid compound is selected from the group consisting of ferric chloride, aluminum chloride and zinc chloride.

15. An article as defined in claim 13, wherein the Lewis acid compound is ferric chloride.

16. An article as defined in claim 15, wherein said ferric chloride is present in an amount to provide 10 to 30 ppm iron.

17. A thermoformable coated article comprising a polycarbonate substrate having at least one surface coated with a coating composition comprising a colloidal silica filled thermoset polysiloxane containing a silylated ultraviolet radiation screening compound and a small amount of a Lewis acid compound.

18. An article as defined in claim 17, wherein said Lewis acid compound is selected from the group consisting of ferric chloride, aluminum chloride and zinc chloride.

19. An article as defined in claim 18, wherein said Lewis acid compound is ferric chloride.

20. An article as defined in claim 19, wherein said coating composition contains sufficient ferric chloride to provide 10 to 30 ppm iron.

21. A composition as defined in claim 18, wherein said ultraviolet radiation screening compound is 4(3-triethoxysilylpropoxy)-2-hydroxybenzophenone.

* * * * *